US008645577B2

(12) United States Patent
Maeng et al.

(10) Patent No.: US 8,645,577 B2
(45) Date of Patent: *Feb. 4, 2014

(54) METHOD AND APPARATUS FOR OUTPUTTING EVENT OF THIRD PARTY DEVICE IN HOME NETWORK SUPPORTING UPNP REMOTE PROTOCOL

(75) Inventors: Je-young Maeng, Suwon-si (KR); Young-sun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,153

(22) Filed: May 2, 2012

(65) Prior Publication Data

US 2012/0215842 A1  Aug. 23, 2012

Related U.S. Application Data

(62) Division of application No. 12/336,613, filed on Dec. 17, 2008, now Pat. No. 8,214,534.

(30) Foreign Application Priority Data

Jan. 17, 2008 (KR) .......................... 10-2008-0005323

(51) Int. Cl.
*G06F 15/16* (2006.01)
(52) U.S. Cl.
USPC ............ 709/249; 709/203; 709/207; 709/219
(58) Field of Classification Search
USPC .................................. 709/203, 207, 219, 249
See application file for complete search history.

(56) References Cited

U.S. PATENT DOCUMENTS

| 7,349,967 | B2 * | 3/2008 | Wang .............................. 709/227 |
| 7,398,305 | B2 * | 7/2008 | Bodin et al. ................... 709/222 |
| 7,574,660 | B2 * | 8/2009 | Campbell et al. ............. 715/741 |
| 7,958,272 | B2 * | 6/2011 | Ko et al. ....................... 709/250 |
| 8,045,570 | B2 * | 10/2011 | Allan et al. .................... 370/401 |

(Continued)

FOREIGN PATENT DOCUMENTS

| JP | 200227571 A | 1/2002 |
| JP | 2005173885 A | 6/2005 |

(Continued)

OTHER PUBLICATIONS

Communication dated May 30, 2012 from the Japanese Patent Office in counterpart Japanese application No. 2010-543060.

(Continued)

*Primary Examiner* — Ranodhi Serrao
(74) *Attorney, Agent, or Firm* — Sughrue Mion, PLLC

(57) ABSTRACT

An apparatus for outputting an event of a third party device in a home network is provided, which includes a remote user interface (RUI) client taking part in a user interface (UI) session using a universal plug and play (UPnP) remote protocol; an RUI server taking part in the UI session, judging whether the RUI client exists on the home network, storing and transmitting an event message of a third party device that does not take part in the UI session; and an i-box receiving the event message from the RUI server if the RUI client does not exist on the home network, and transmitting the event message to the RUI client existing outside the home network by using an external network.

12 Claims, 6 Drawing Sheets

(56) References Cited

U.S. PATENT DOCUMENTS

| | | |
|---|---|---|
| 2001/0033554 A1* | 10/2001 | Ayyagari et al. .............. 370/328 |
| 2003/0001883 A1* | 1/2003 | Wang ............................ 345/736 |
| 2004/0204086 A1* | 10/2004 | Choi et al. ................... 455/557 |
| 2004/0205172 A1* | 10/2004 | Kim .............................. 709/222 |
| 2005/0232283 A1 | 10/2005 | Moyer et al. |
| 2005/0240758 A1 | 10/2005 | Lord et al. |
| 2006/0037036 A1 | 2/2006 | Min et al. |
| 2006/0155851 A1 | 7/2006 | Ma et al. |
| 2006/0200570 A1 | 9/2006 | Stirbu et al. |
| 2007/0089055 A1* | 4/2007 | Ko et al. ...................... 715/700 |
| 2008/0069121 A1* | 3/2008 | Adamson et al. ............ 370/401 |
| 2009/0080453 A1 | 3/2009 | Stirbu |
| 2010/0071053 A1* | 3/2010 | Ansari et al. .................. 726/12 |
| 2010/0080238 A1* | 4/2010 | Allan et al. ................... 370/401 |
| 2010/0269146 A1* | 10/2010 | Britt .............................. 725/110 |
| 2011/0119356 A1* | 5/2011 | Abe ............................... 709/219 |
| 2011/0317678 A1* | 12/2011 | Allan et al. ................... 370/338 |

FOREIGN PATENT DOCUMENTS

| | | |
|---|---|---|
| JP | 2005216249 A | 8/2005 |
| KR | 10-2005-0078551 A | 8/2005 |
| KR | 10-2005-0079480 A | 8/2005 |
| KR | 10-2006-0067713 A | 6/2006 |

OTHER PUBLICATIONS

Communication dated Dec. 6, 2012 issued by the State Intellectual Property Office of P.R. China in counterpart Chinese Patent Application No. 200980102474.4.

\* cited by examiner

METHOD AND APPARATUS FOR OUTPUTTING EVENT OF THIRD PARTY DEVICE IN HOME NETWORK SUPPORTING UPNP REMOTE PROTOCOL

CROSS-REFERENCE TO RELATED APPLICATION

This application is a Divisional of U.S. application Ser. No. 12/336,613, filed Dec. 17, 2008, which is based on and claims priority from Korean Patent Application No. 10-2008-0005323, filed on Jan. 17, 2008 in the Korean Intellectual Property Office, the disclosure of which is incorporated herein in its entirety by reference.

BACKGROUND OF THE INVENTION

1. Field of the Invention

The present invention relates to a method and apparatus for outputting an event of a third party device in a home network, and more particularly, to a method and apparatus for outputting an event of a third party device in a UPnP home network supporting a UPnP remote UI (User Interface), which can losslessly transfer various events generated from a remote UI server to a user when the user is absent.

2. Description of the Prior Art

Generally, as the home network industry develops, a procedure and method of effectively controlling devices at home and transferring events generated from the devices to a user becomes more important.

Although an existing UPnP (Universal Plug and Play) technology for controlling devices at home satisfies most requirements, it does not allow for receipt of when there is no subscription, and thus a user cannot detect the event of a third party device that is generated from a remote UI (RUI) server.

In order to solve the above-described problems, the applicant has proposed a method of effectively displaying an event sent from a third party device that does not take part in a UPnP remote UI session (Korean Patent Application No. 10-2006-67635) and a method of storing an event log and thus making it possible to view a corresponding event later (Korean Patent Application Nos. 10-2006-31651 and 10-2006-28506).

However, the above-described methods also have the problem that the event cannot be confirmed in the case where a user is away from a home network supporting a UPnP remote UI.

For example, although the event log technology stores an event in an RUI client and provides an environment in which a user can confirm and search the event later, it still fails to catch the event generated from the RUI server in the case where the RUI client does not exist in the home network or a power supply is cut off.

Accordingly, the user, who has just returned home, does not know the event has been generated during the user's absence, and thus cannot properly manage the generated event.

SUMMARY OF THE INVENTION

Accordingly, the present invention has been made to address the above-mentioned problems occurring in the prior art, and an aspect of the present invention is to provide a method and apparatus for outputting an event of a third party device in a UPnP home network supporting a UPnP remote UI (User Interface), which can losslessly transfer various events generated from a remote UI server to a user when the user is absent.

Additional advantages, aspects, and features of the invention will be set forth in part in the description which follows and in part will become apparent to those having ordinary skill in the art upon examination of the following or may be learned from practice of the invention.

In order to accomplish these aspects, there is provided a method of outputting an event of a third party device in a home network including a remote user interface (RUI) server and an RUI client, which take part in a user interface (UI) session, and a third party device which does not take part in the UI session, according to the present invention, which includes (a) the RUI server storing an event message of the third party device; (b) the RUI server confirming whether the RUI client exists on the home network; (c) if the RUI client exists on the home network, the RUI server transmitting the event message to the RUI client, and if the RUI client does not exist on the home network, the RUI server transmitting the event message to a pre-registered i-box; and (d) the i-box transmitting the event message received from the RUI server to the third party device existing outside the home network by using an external network.

In another aspect of the present invention, there is provided an apparatus for outputting an event of a third party device in a home network, which includes a remote user interface (RUI) client which takes part in a user interface (UI) session using a universal plug and play (UPnP) remote protocol; an RUI server taking part in the UI session, which judges whether the RUI client exists on the home network, and stores and transmits an event message of a third party device that does not take part in the UI session; and an i-box which receives the event message from the RUI server if the RUI client does not exist on the home network, and transmitting the event message to the RUI client existing outside the home network by using an external network.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Figure 1:
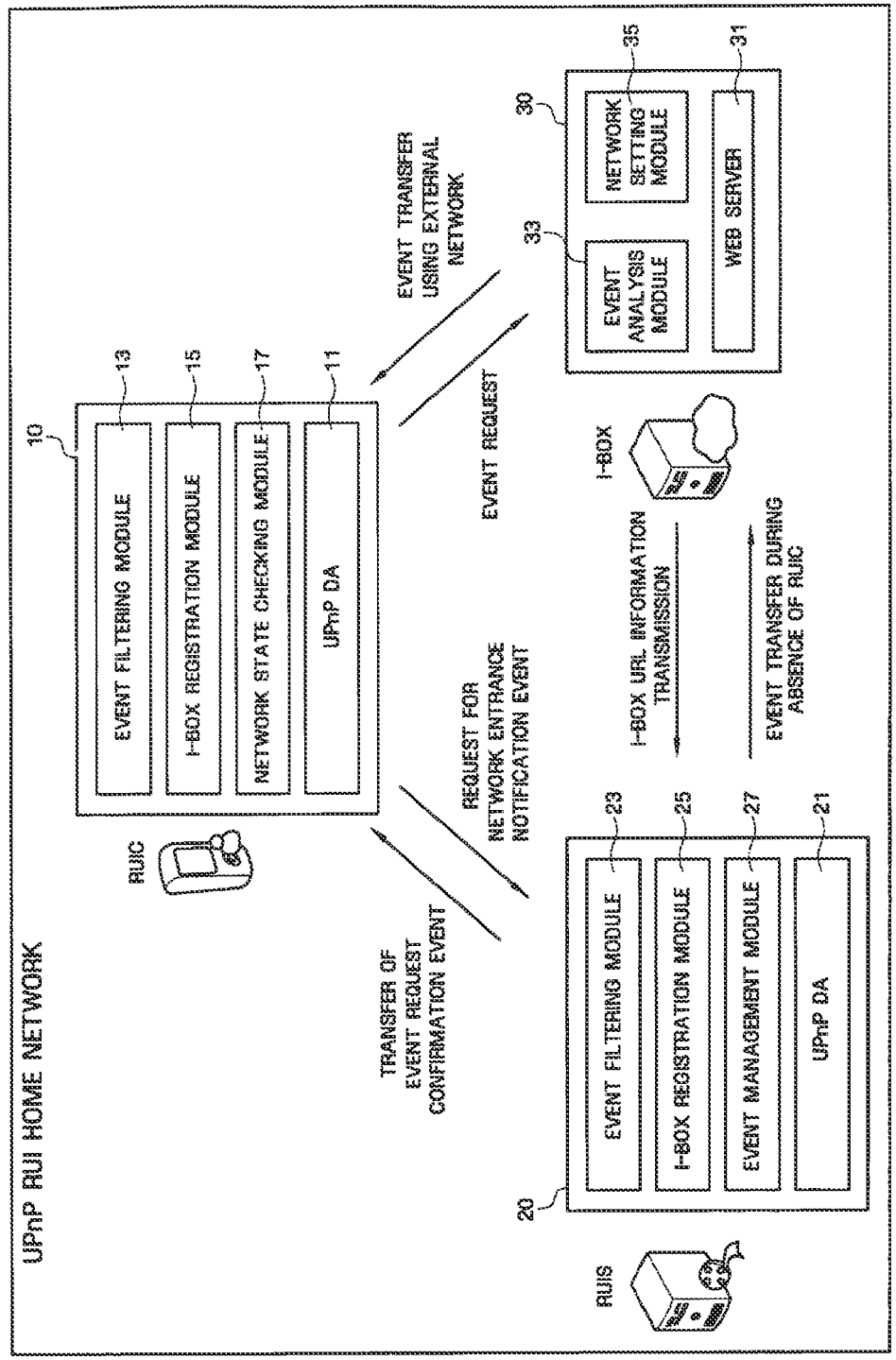
FIG. 1 is a block diagram illustrating the configuration of an apparatus for outputting an event of a third party device in a UPnP home network according to an exemplary embodiment of the present invention.

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

A method and apparatus for outputting an event of a third party device in a home network supporting a UPnP remote protocol according to embodiments of the present invention will be described with reference to the accompanying drawings. For reference, in the following description, well-known processes, structures, and technologies are not described in detail since that would obscure the invention in unnecessary detail.

FIG. 1 is a block diagram illustrating the configuration of an apparatus for outputting an event of a third party device in a UPnP home network according to an embodiment of the present invention.

As illustrated in FIG. 1, the apparatus for outputting an event of a third party device in a UPnP home network, includes a remote user interface (RUI) client 10, an RUI server (RUIS) 20, and an i-box 30.

The RUI client (RUIC) 10 may be provided with a UPnP device architecture (DA) 11 in order to take part in a user interface (UI) session using a UPnP (Universal Plug and Play) remote protocol. Here, the RUIC 10 includes a user mobile device such as a portable phone, a notebook computer, a PDA, and so forth.

The RUIC 10 may be provided with an event filtering module 13 filtering an event message received from the RUIS 20 in accordance with a user's stored intention or a user's stored propensity.

The RUIC 10 may be provided with a network state checking module 17 continuously checking whether the RUIC itself is connected to the home network.

If the RUIC 10 recognizes that the network state checking module 17 is disconnected from the home network, it sets a connection with the i-box 30 through a currently available IP network, and if it has newly entered into the home network, it notifies the RUI server 20 of this entering.

The RUI server (RUIS) 20 may be provided with a UPnP DA 21 in order to take part in the UI session by using the UPnP remote protocol.

The RUIS 20 stores and transmits an event message of the third party device that does not take part in the UI session.

The RUIS 20 confirms whether the RUIC 10 exists on the home network. More specifically, the RUIS 20 continuously confirms whether an event request is made by the RUIC 10 in order to judge whether the RUIC 10 exists in the home network.

If the event request is made by the RUIC 10, the RUIS 20 judges that the RUIC 10 exists in the home network, and transmits an event message to the RUIC 10. At this time, the RUIS 20 may instantly discard the event message or may store the event message for a predetermined time period for a user's search and confirmation in future.

The RUIS 20 may be provided with an event filtering module 23 filtering the event message in accordance with an accept ratio or a predefined setting.

The RUIS 20 may be provided with an i-box management module 25 registering URL information of the i-box 30, which is to transmit the event message, if the RUIC 10 leaves the home network.

The RUIS 20 may be provided with an event management module 27 managing whether the event request is made by the RUIC 10 in order to judge whether the RUIC 10 exists on the home network.

If there is no event request from the RUIC 10 for a predetermined time, the event management module 27 judges that the RUIC 10 operating on the home network does not exist.

The RUIS 20 stores therein or transmits the event message to the i-box 30 in accordance with the priority of the event message.

More specifically, if the priority of the event message is not high, the RUIS 20 records and stores the event message therein, while if the priority of the event message is high, it transmits the event message to the pre-registered i-box 30.

The i-box 30 may be provided with a web server 31 for connecting the RUIS 20 to the Internet.

If the RUIC 10 does not exist on the home network, the i-box 30 receives the event message from the RUIS 20, and transmits the received event message to the RUIC 10 outside the home network by using an external network.

More specifically, the i-box 30 transmits the event message received from the RUIS 20 to the RUIC 10 through a mobile network by using the URL of the pre-registered i-box 30.

The i-box 30 may be provided with an event analysis module 33 receiving and analyzing the event message from the RUIS 20 if the RUIC 10 does not exist on the home network.

The i-box 30 may be provided with a network setting module 35 setting a mobile network for transmitting the event message analyzed by the event analysis module 33 to the RUIC 10 existing outside the home network.

Hereinafter, with reference to FIGS. 2 to 6, a method of outputting an event of a third party device in a home network supporting a UPnP remote protocol according to an embodiment of the present invention will be described in detail.

Figure 2:
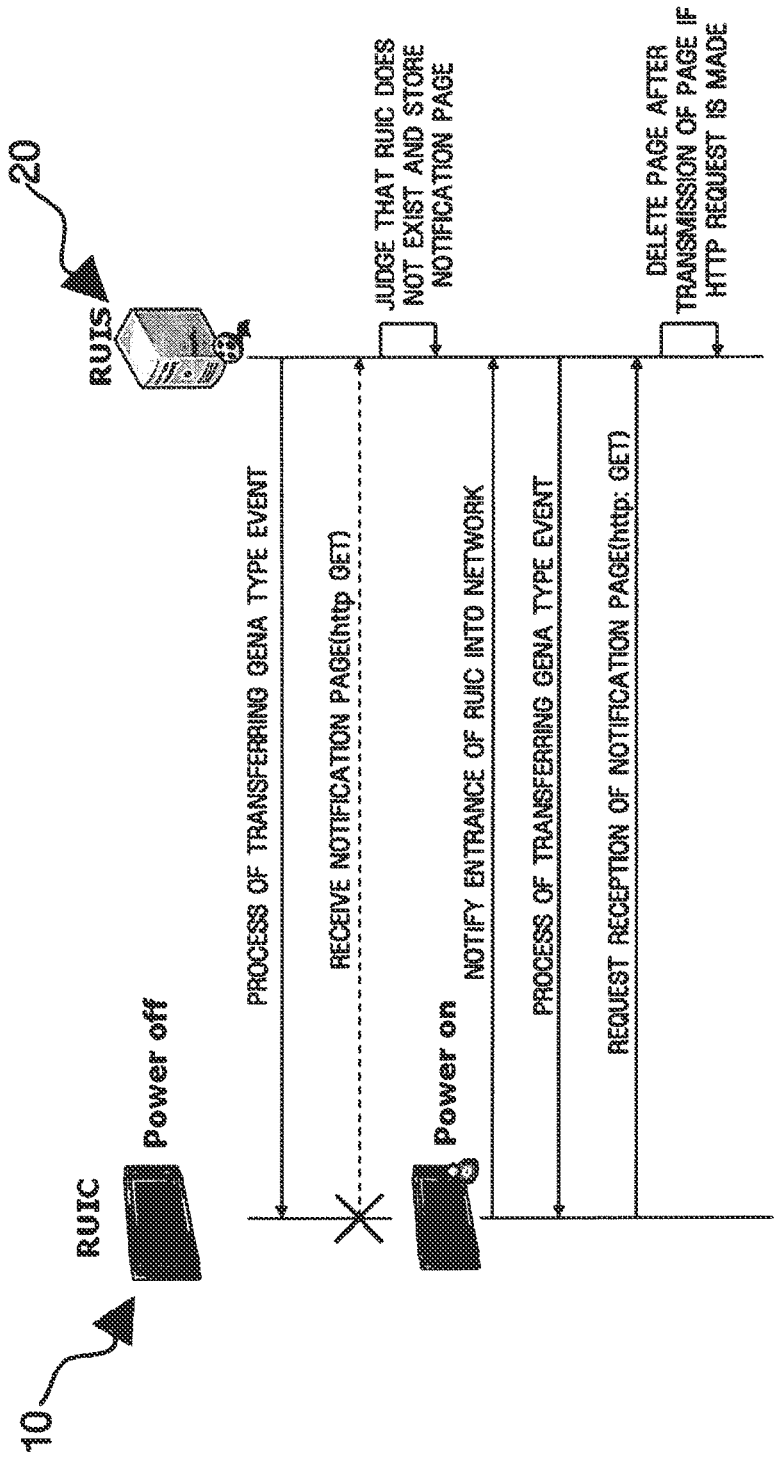
FIG. 2 is a view illustrating a process of outputting an event of a third party device in a UPnP home network according to an exemplary embodiment of the present invention.

FIG. 2 is a view illustrating a process of outputting an event of a third party device in a UPnP home network according to an embodiment of the present invention.

As illustrated in FIG. 2, in the UPnP home network, the event message of the third party device stored in the RUIS 20 is transmitted to the RUIC 10 in an XML form (GENA). In this case, if the power supply to the RUIC 10 is in an off state, the RUIC 10 does not make the event request to the RUIS 20. That is, if there is no event request from the RUIC 10 for a predetermined time, the RUIS 20 judges that the RUIC 10 operating on the home network does not exist, and stores the event message.

If the power supply to the RUIC 10 is in an on state, the RUIC 10 notifies the RUIS 20 of its entering into the network, and the RUIS 20, having received the notification from the RUIC 10, recognizes that RUIC 10 has entered into the home network, and transmits the stored event message to the RUIC 10. At this time, it is preferable, but not necessary, for the RUIS 20 to delete the event message after completing the transmission of the event message.

Figure 3:
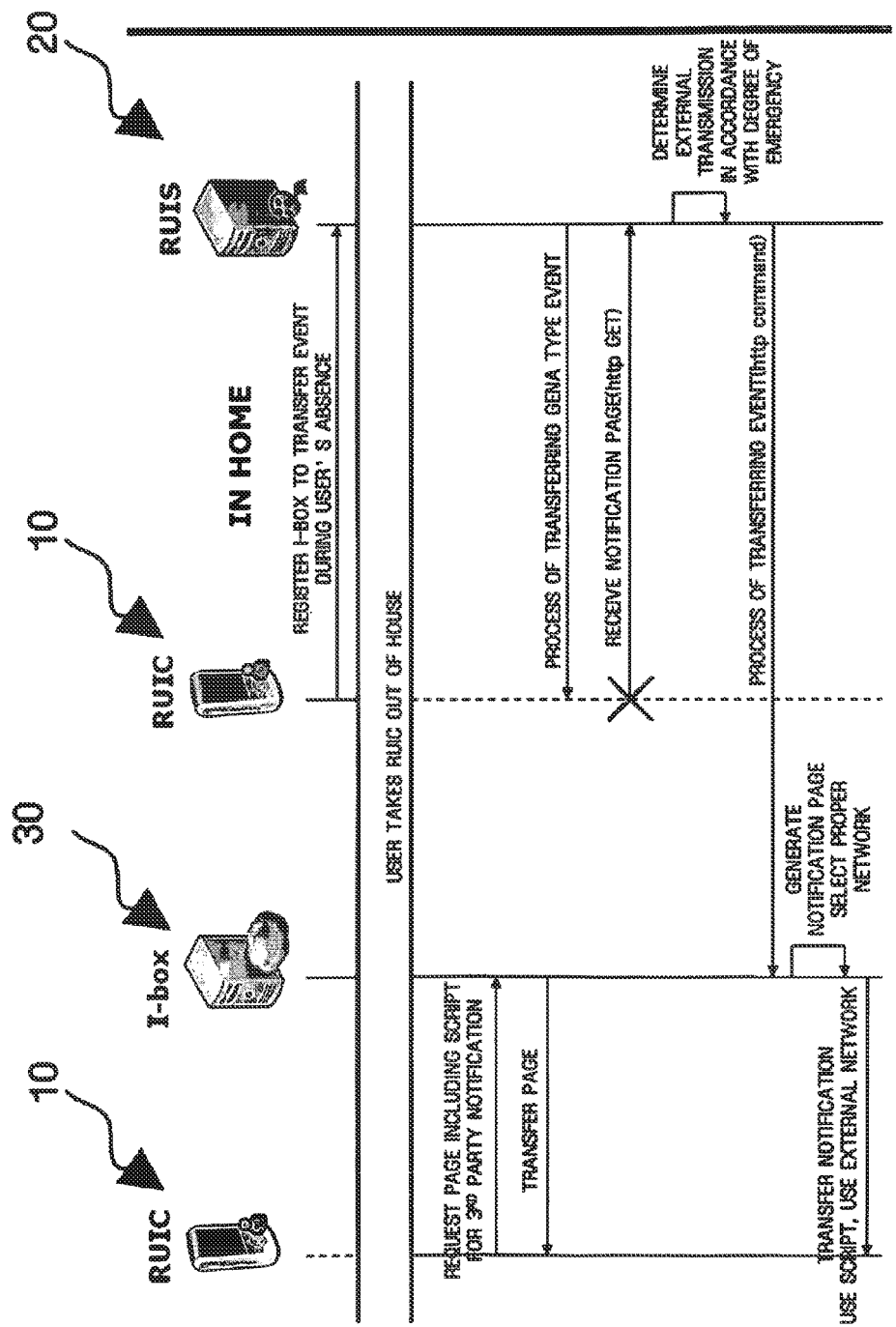
FIG. 3 is a view illustrating a process of outputting an event of a third party device outside a UPnP home network according to an exemplary embodiment of the present invention.

FIG. 3 is a view illustrating a process of outputting an event of a third party device outside a UPnP home network according to an embodiment of the present invention.

As illustrated in FIG. 3, when taking the RUIC 10 out of the home network, the user registers the i-box 30 to which the event will be transmitted during the user's absence.

The RUIC 10 existing outside the home network requests the event of the third party device to the i-box 30.

If the RUIC 10 makes the event request to the i-box 30, the RUIS 20 transmits the event message to the i-box 30 by using the URL of the pre-registered i-box 30 and the Internet protocol.

The i-box 30 processes the event message received from the RUIS 20, and confirms whether there is the event request from the RUIC 10. If the RUIC 10 has made the event request, the i-box 30 transmits the event message received from the RUIS 20 to the RUIC 10 by using the mobile network.

Figure 4:
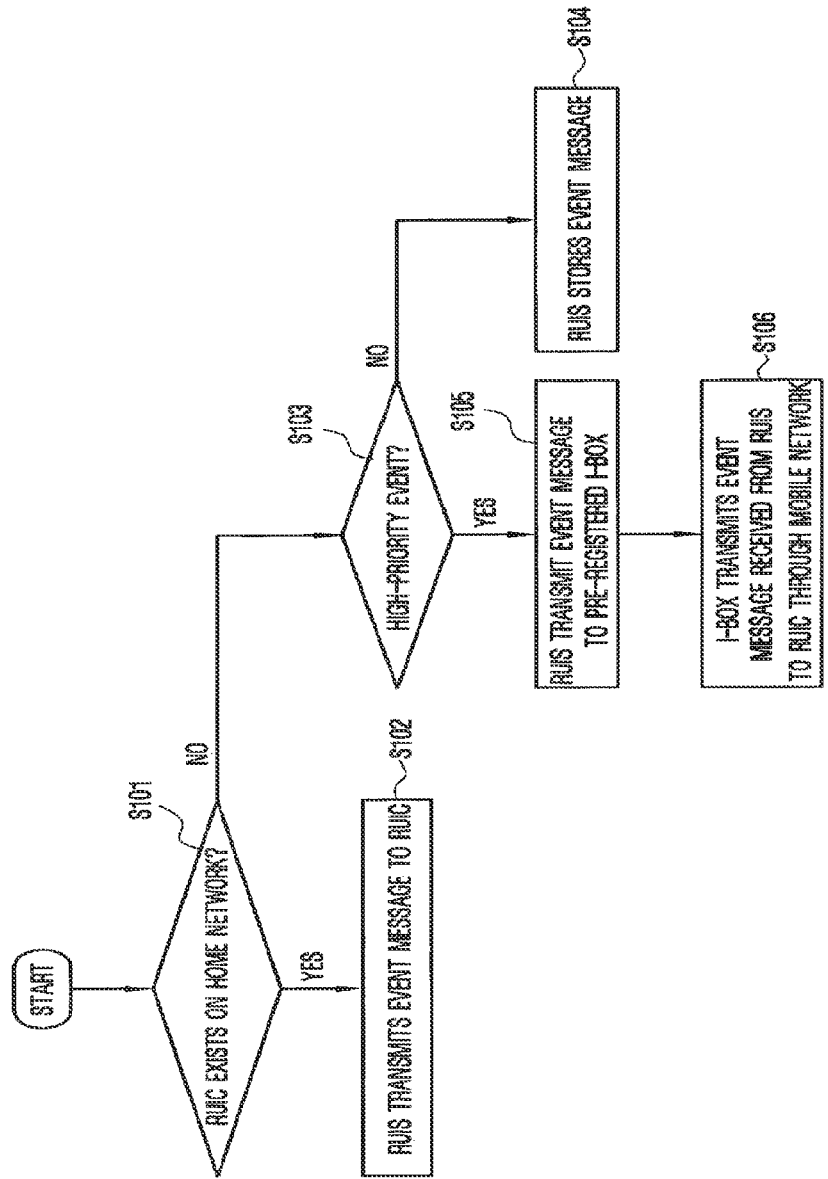
FIG. 4 is a flowchart illustrating a method of outputting an event of a third party device in a UPnP home network according to an exemplary embodiment of the present invention.

FIG. 4 is a flowchart illustrating a method of outputting an event of a third party device in a UPnP home network according to an embodiment of the present invention.

As illustrated in FIG. 4, in a home network including an RUIC 10 and an RUIS 20, which take part in a UI session, and a third party device that does not take part in the UI session, the RUIS 20 confirms whether the RUIC 10 exists on the home network S101. At this time, the RUIS 20 confirms whether the RUIC 10 exists on the home network by continuously judging whether an event request is made by the RUIC 10. For example, if there is no event request from the RUIC 10 for a predetermined time, the RUIS 20 judges that the RUIC 10 does not exist on the home network.

Then, if the RUIC 10 exists on the home network, the RUIC 10 makes the event request to the RUIS 20, and the RUIC 10, having received the event request from the RUIC 10, transmits an event message to the RUIC 10 through the UPnP home network S102. On the other hand, if the RUIC 10 does not exist on the home network, i.e., if the user takes the RUIC 10 out of the UPnP home network, the RUIS 20 transmits the event message to the i-box 30 through the pre-registration of the URL information of the i-box 30 to which the event message will be transmitted.

At this time, the RUIS 20 registers therein or transmits to the i-box 30 the event message in accordance with the priority of the event message S103. More specifically, if the priority of the event message is not high, the RUIS 20 records and stores the event message therein S104, while if the priority of the event message is high, it transmits the event message to the pre-registered i-box 30 S105. At this time, the RUIS 20 filters and stores the event message in accordance with the accept ratio and the predefined setting.

Then, the i-box 30 transmits the event message received from the RUIS 20 to the RUIC 10 existing outside the home network by using an external network S106. More specifically, the i-box 30 transmits the event message received from the RUIS 20 to the RUIC 10 through a mobile network by using the URL of the pre-registered i-box 30.

Figure 5:
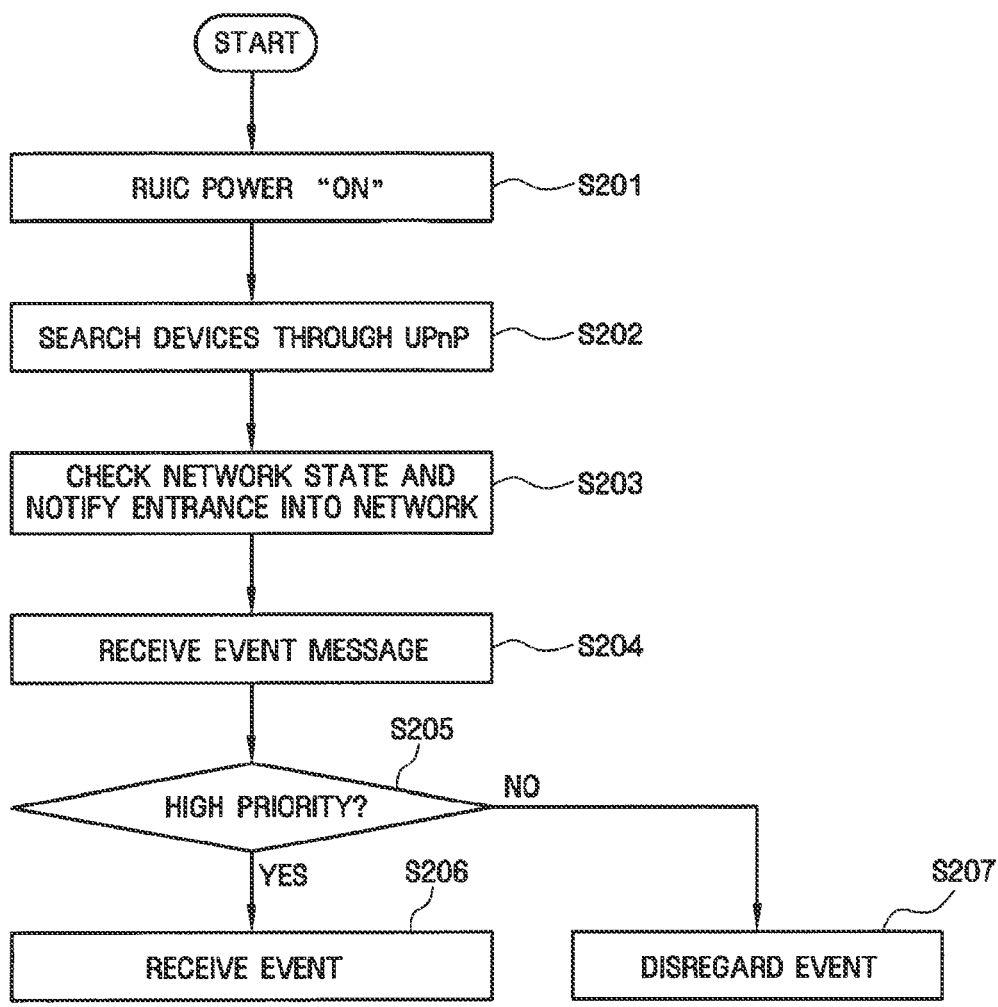
FIG. 5 is a flowchart explaining the operation of an RUI client in a method of outputting an event of a third party device in a UPnP home network according to an exemplary embodiment of the present invention.

FIG. 5 is a flowchart explaining the operation of an RUI client in a method of outputting an event of a third party device in a UPnP home network according to an embodiment of the present invention.

As illustrated in FIG. 5, the RUIC 10, in a power-on state S201, searches devices in a home network through a UPnP remote protocol S202.

The RUIC 10 checks the home network state S203, and reports that it has entered into the home network by making an event request to the RUIS 20. At this time, the RUIC 10 checks the user's intention or predefined rule.

The RUIC 10 receives the event from the RUIS 20 S204, judges and filters whether the priority of the received event is high S205.

For example, if the event has a high priority, the RUIC 10 shows the event page requested to the RUIS 20 to the user S206, while if the event has a low priority, the RUIC 10 disregards the event page S207.

Figure 6:
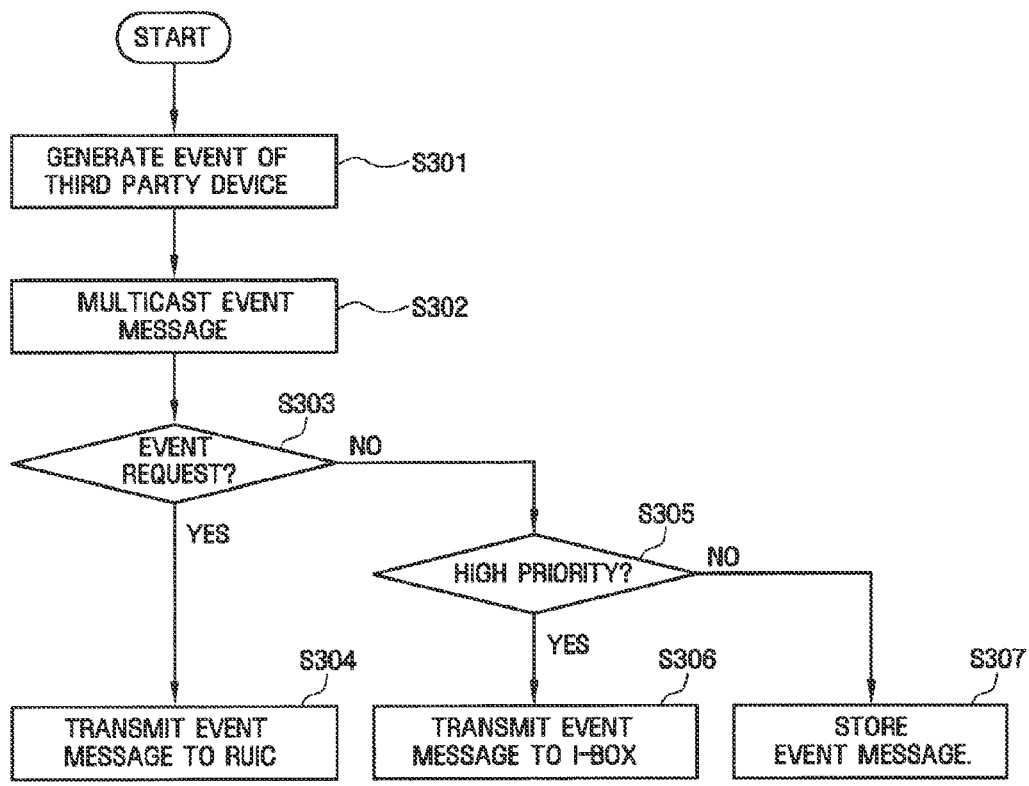
FIG. 6 is a flowchart explaining the operation of an RUI server in a method of outputting an event of a third party device in a UPnP home network according to an exemplary embodiment of the present invention.

FIG. 6 is a flowchart explaining the operation of an RUI server in a method of outputting an event of a third party device in a UPnP home network according to an embodiment of the present invention.

As illustrated in FIG. 6, if an event of the third party device is generated S301, the RUIS 20 generates and multicasts an event message in an XML form (GENA) S302. At this time, in order to judge whether the RUIC 10 exists in the home network, the RUIS 20 continuously confirms whether there is an event request from the RUIC 10 S303.

If there is an event request from the RUIC 10, the RUIS 20 judges that the RUIC 10 exists in the home network, and transmits the event message to the RUIC 10. At this time, the RUIS 20 may instantly delete the event message or may store the event message for a predetermined time period for user's search and confirmation in the future.

If there is no event request from the RUIC 10 for a predetermined time, the RUIS 20 judges that the RUIC 10 operating on the home network does not exist. Then, the RUIS 20 judges whether the priority of the event is high S305, and stores therein or transmits the event message to the i-box 30 in accordance with the priority of the event.

More specifically, if the priority of the event message is high, the RUIS 20 transmits the event message to the pre-registered i-box 30 S306, while if the priority of the event message is not high, the RUIS 20 stores the event message therein S307.

The i-box 30 processes the event message received from the RUIS 20, and transmits the processed event message to the RUIC 10 through a mobile network.

As described above, the method and apparatus for outputting an event of a third party device in a home network according to the present invention may have one or more of the following effects.

First, a user can losslessly receive various events generated from a remote UI server without providing additional equipment. For example, the user can see transmission ID information and device information received during the user's absence, and if the event has a high priority, the user can directly receive the event.

Second, the compatibility with the existing product, for example, Samsung CEA-2014 RUI device, is maintained, and thus there is no trouble in using the existing device.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of outputting an event of a third party device in a home network including a remote user interface (RUI) server and an RUI client, which take part in a user interface (UI) session, and a third party device which does not take part in the UI session, the method comprising:
   (a) the RUI server storing an event message of the third party device;
   (b) the RUI server confirming whether the RUI client exists on the home network;
   (c) if the RUI client exists on the home network, the RUI server transmitting the event message to the RUI client, and if the RUI client does not exist on the home network, the RUI server transmitting the event message to a pre-registered i-box; and
   (d) the i-box transmitting the event message received from the RUI server to the RUI client existing outside the home network by using an external network.

2. The method of claim 1, wherein (a) comprises the RUI server filtering the event message.

3. The method of claim 1, wherein (b) comprises the RUI server judging whether the RUI client exists on the home network in accordance with existence/nonexistence of an event request from the RUI client.

4. The method of claim 3, wherein if there is no event request from the RUI client for a predetermined time, the RUI server judges that the RUI client operating on the home network does not exist.

5. The method of claim 1, wherein (c) comprises the RUI client filtering the event message received from the RUI server.

6. The method of claim 1, wherein (c) comprises requesting the event from the RUI server if the RUI client exists inside the home network.

7. The method of claim 1, wherein (c) comprises requesting the event from the i-box if the RUI client exists outside the home network.

8. The method of claim 1, wherein (c) comprises the RUI server registering URL information of the i-box to which the event message is to be transmitted if the RUI client exists outside the home network.

9. The method of claim 1, wherein (c) comprises the RUI server storing therein or transmitting to the i-box the event message in accordance with a priority of the event message.

10. The method of claim 9, wherein if the priority of the event message is not high, the RUI server records and stores the event message therein.

11. The method of claim 9, wherein if the priority of the event message is high, the RUI server transmits the event message to the pre-registered i-box.

12. The method of claim 11, wherein (d) comprises the i-box transmitting the event message received from the RUI server to the RUI client through a mobile network by using a URL of the pre-registered i-box.

* * * * *